United States Patent
Sullivan (10) Patent No.: US 12,051,064 B2
(45) Date of Patent: Jul. 30, 2024

(54) TRANSACTION MESSAGING

(71) Applicant: VISA EUROPE LIMITED, London (GB)

(72) Inventor: Brian Sullivan, London (GB)

(73) Assignee: VISA EUROPE LIMITED, London (GB)

( * ) Notice: Subject to any disclaimer, the term of this patent is extended or adjusted under 35 U.S.C. 154(b) by 284 days.

(21) Appl. No.: 16/991,386

(22) Filed: Aug. 12, 2020

(65) Prior Publication Data

US 2020/0372503 A1     Nov. 26, 2020

Related U.S. Application Data

(60) Division of application No. 15/495,249, filed on Apr. 24, 2017, now Pat. No. 10,769,628, which is a
(Continued)

(30) Foreign Application Priority Data

Oct. 24, 2014    (GB) ..................................... 1419016

(51) Int. Cl.
    *G06Q 20/38*      (2012.01)
    *G06Q 20/32*      (2012.01)
    *G06Q 20/40*      (2012.01)

(52) U.S. Cl.
    CPC ..... *G06Q 20/3829* (2013.01); *G06Q 20/3227* (2013.01); *G06Q 20/3278* (2013.01);
(Continued)

(58) Field of Classification Search
None
See application file for complete search history.

(56) References Cited

U.S. PATENT DOCUMENTS

| | | |
|---|---|---|
| 5,280,527 A | 1/1994 | Gullman et al. |
| 5,613,012 A | 3/1997 | Hoffman et al. |

(Continued)

FOREIGN PATENT DOCUMENTS

| | | |
|---|---|---|
| EP | 0982958 | 3/2000 |
| EP | 1028401 | 8/2000 |

(Continued)

OTHER PUBLICATIONS

Ling, Jie, "Smart card fault attacks on public key and elliptic curve cryptography", ProQuest Dissertations Publishing. (2014) (Year: 2014).*

(Continued)

*Primary Examiner* — Neha Patel
*Assistant Examiner* — Clay C Lee
(74) *Attorney, Agent, or Firm* — Kilpatrick Townsend & Stockton LLP (57) ABSTRACT

There is described a method for transmitting a transaction message from a transaction device having a transaction device identifier. The method involves encrypting, at a transaction device, a transaction device identifier, generating, at the transaction device, a transaction message for a transaction system, the transaction message comprising, at least, a first data field configured to hold a transaction device identifier and a second data field configured to hold supplementary data, and sending the transaction message to a transaction processing system. The generation of the transaction message comprises providing data in the first data field of the transaction message that does not identify the transaction device and providing the encrypted transaction device identifier in the second data field of the transaction message.

15 Claims, 5 Drawing Sheets

Related U.S. Application Data continuation of application No. PCT/GB2015/053200, filed on Oct. 26, 2015.

(52) U.S. Cl.
CPC ....... *G06Q 20/3825* (2013.01); *G06Q 20/385* (2013.01); *G06Q 20/401* (2013.01)

(56) References Cited

U.S. PATENT DOCUMENTS

| | | |
|---|---|---|
| 5,781,438 A | 7/1998 | Lee et al. |
| 5,883,810 A | 3/1999 | Franklin et al. |
| 5,930,767 A | 7/1999 | Reber et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,453,301 B1 | 9/2002 | Niwa |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,060,448 B2 | 11/2011 | Jones |
| 8,060,449 B1 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen et al. |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,132,723 B2 | 3/2012 | Hogg et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren |
| 8,433,116 B2 | 4/2013 | Butler et al. |
| 8,447,699 B2 | 5/2013 | Batada et al. |
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |

(56) References Cited

U.S. PATENT DOCUMENTS

| | | |
|---|---|---|
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,528,067 B2 | 9/2013 | Hurry et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | McGuire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,751,391 B2 | 6/2014 | Freund |
| 8,751,642 B2 | 6/2014 | Vargas et al. |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 9,646,303 B2 | 5/2017 | Karpenko et al. |
| 9,680,942 B2 | 6/2017 | Dimmick |
| 10,270,587 B1* | 4/2019 | Wu .................. H04L 9/3234 |
| 10,769,628 B2 | 9/2020 | Sullivan |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0091648 A1 | 7/2002 | Phillips et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0078340 A1* | 4/2004 | Evans .................. G06Q 20/401 705/64 |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0193891 A1 | 9/2004 | Ollila |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0236632 A1 | 11/2004 | Maritzen et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0300738 A1 | 12/2009 | Dewe et al. |
| 2009/0307139 A1 | 12/2009 | Mardikar et al. |
| 2009/0308921 A1 | 12/2009 | Mullen |
| 2009/0319784 A1 | 12/2009 | Faith et al. |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |

(56) References Cited

U.S. PATENT DOCUMENTS

| | | |
|---|---|---|
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0270751 A1 | 11/2011 | Csigner et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder, II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0159195 A1* | 6/2013 | Kirillin ............... H04L 63/105 705/71 |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226802 A1 | 8/2013 | Hammad et al. |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |

(56) References Cited

U.S. PATENT DOCUMENTS

| | | |
|---|---|---|
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0006785 A1 | 1/2014 | Shaliv et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0095219 A1* | 4/2015 | Hurley .................. G06Q 20/382 705/39 |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199682 A1* | 7/2015 | Kalgi .................. G06Q 20/32 705/64 |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0310425 A1* | 10/2015 | Cacioppo ............. G06Q 20/382 705/64 |
| 2015/0312038 A1 | 10/2015 | Palanisamy |
| 2015/0319158 A1 | 11/2015 | Kumnick |
| 2015/0324736 A1 | 11/2015 | Sheets et al. |
| 2015/0332262 A1 | 11/2015 | Lingappa |
| 2015/0356560 A1 | 12/2015 | Shastry et al. |
| 2015/0363781 A1 | 12/2015 | Badenhorst |
| 2015/0372811 A1* | 12/2015 | Le Saint ............... H04L 63/068 705/76 |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0260097 A1* | 9/2016 | Nadella ............... G06Q 20/401 |
| 2016/0269391 A1 | 9/2016 | Gaddam et al. |
| 2016/0308995 A1 | 10/2016 | Youdale et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi et al. |
| 2017/0148013 A1 | 5/2017 | Rajurkar et al. |
| 2017/0163617 A1 | 6/2017 | Laxminarayanan et al. |
| 2017/0163629 A1 | 6/2017 | Law et al. |
| 2017/0186001 A1 | 6/2017 | Reed et al. |
| 2017/0200156 A1 | 7/2017 | Karpenko et al. |
| 2017/0200165 A1 | 7/2017 | Laxminarayanan et al. |
| 2017/0201520 A1 | 7/2017 | Chandoor et al. |
| 2017/0220818 A1 | 8/2017 | Nagasundaram et al. |
| 2017/0221054 A1 | 8/2017 | Flurscheim et al. |
| 2017/0221056 A1 | 8/2017 | Karpenko et al. |
| 2017/0228723 A1 | 8/2017 | Taylor et al. |
| 2017/0236113 A1 | 8/2017 | Chitalia et al. |
| 2017/0293914 A1 | 10/2017 | Girish et al. |
| 2017/0295155 A1 | 10/2017 | Wong |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin et al. |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268399 A1 | 9/2018 | Spector et al. |
| 2018/0268405 A1 | 9/2018 | Lopez |

(56) References Cited

U.S. PATENT DOCUMENTS

| | | |
|---|---|---|
| 2018/0285875 A1 | 10/2018 | Law et al. |
| 2018/0324184 A1 | 11/2018 | Kaja et al. |
| 2018/0324584 A1 | 11/2018 | Lopez |
| 2019/0020478 A1 | 1/2019 | Girish et al. |
| 2019/0066069 A1 | 2/2019 | Faith et al. |
| 2019/0147439 A1 | 5/2019 | Wang et al. |
| 2019/0356489 A1 | 11/2019 | Palanisamy |
| 2019/0384896 A1 | 12/2019 | Jones |
| 2019/0392431 A1 | 12/2019 | Chitalia et al. |

FOREIGN PATENT DOCUMENTS

| | | | |
|---|---|---|---|
| EP | 2156397 | 2/2010 | |
| EP | 2365469 A1 * | 9/2011 | ............ G06Q 20/04 |
| JP | 2002-053672 A2 | 2/2002 | |
| KR | 10-2008-059617 A | 6/2008 | |
| RU | 2419872 C2 * | 5/2011 | ........... G06Q 20/204 |
| WO | 0014648 | 3/2000 | |
| WO | 01035304 | 5/2001 | |
| WO | 01035304 | 5/2002 | |
| WO | 2004042536 | 5/2004 | |
| WO | 2004051585 | 6/2004 | |
| WO | 2005001751 | 1/2005 | |
| WO | 2006113834 | 10/2006 | |
| WO | 2009032523 | 3/2009 | |
| WO | 2010034879 | 4/2010 | |
| WO | 2010078522 | 7/2010 | |
| WO | 2012068078 | 5/2012 | |
| WO | 2012098556 | 7/2012 | |
| WO | 2012142370 | 10/2012 | |
| WO | 2012167941 | 12/2012 | |
| WO | 2013048538 | 4/2013 | |
| WO | 2013056104 | 4/2013 | |
| WO | 2013119914 | 8/2013 | |
| WO | 2013179271 | 12/2013 | |

OTHER PUBLICATIONS

U.S. Appl. No. 15/495,249 , Non-Final Office Action, Mailed On Oct. 18, 2019, 19 pages.

U.S. Appl. No. 15/495,249 , Notice of Allowance, Mailed On May 1, 2020, 9 pages.

Asokan et al., "Mobile Trusted Computing", Proceedings of the IEEE, vol. 102, No. 8, Aug. 1, 2014, pp. 1189-1206.

Application No. EP20209629.3 , Extended European Search Report, Mailed On Apr. 21, 2021, 8 pages.

"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.

U.S. Appl. No. 16/311,144 , Encryption Key Exchange Process Using Access Device, Dec. 18, 2018.

U.S. Appl. No. 16/347,175 , Access Identifier Provisioning to Application, May 2, 2019.

U.S. Appl. No. 16/415,360 , Method and System for Access Token Processing, May 17, 2019, 37 pages.

U.S. Appl. No. 16/444,339 , Recurring Token Transactions, Jun. 18, 2019, 36 pages.

U.S. Appl. No. 16/448,777 , Secure Remote Transaction Framework Using Dynamic Secure Checkout Element, Jun. 21, 2019, 46 pages.

Hellman , "An Overview of Public Key Cryptography", IEEE, Nov. 1978, pp. 24-32.

Office Action Issued Mar. 30, 2022 for KR Patent Application No. 10-2017-7014112, 7 pages.

\* cited by examiner

TRANSACTION MESSAGING

CROSS-REFERENCE TO RELATED APPLICATIONS

This application is a divisional of U.S. patent application Ser. No. 15/495,249, filed Apr. 24, 2017, which is a continuation of International Application No. PCT/GB2015/053200, filed Oct. 26, 2015, which claims the benefit of U.K. Application No. GB1419016.9, filed Oct. 24, 2014. Each of the above-referenced patent applications is incorporated by reference in its entirety.

BACKGROUND OF THE INVENTION

Field of the Invention

The present invention relates to systems and methods for transmitting and processing transaction messages, and in particular to systems and methods useable for sending transaction messages where an identifier is encrypted.

Description of the Related Technology

Smart devices, such as smart cards, access cards, financial instruments such as payment cards, fobs and most recently mobile telephones and other portable electronic devices are increasingly being used to effect transactions. A transaction may involve a number of functions. In a simple form, a user in possession of a suitable smart device may be granted access through a security door. Alternatively, or in addition, such a user may be able to make payments for goods and services, or to use the smart device in ticketing for access to public transport or an event.

A suitable smart device has a processor and a memory. These may be combined in a secure element, which is a piece of tamper resistant hardware which can only be communicated with in a limited fashion.

In use, the smart device is presented to a terminal of a transaction processing system, for example a door lock, a point of sale device or a ticket barrier. The smart device communicates with the terminal. This communication may be contactless for example using near field communications (NFC), or through contact between the device and the terminal. The smart device may communicate solely with the terminal; however more often data provided by the smart device is transmitted through the transaction processing system to a suitable recipient. This recipient authenticates the smart device and may respond, for example by commanding the terminal to open a door or barrier, or by providing data to the smart device.

To enable a smart device to be used in this manner, the smart device is provided with a device identifier. This may be a number, or alphanumeric string which is capable of uniquely identifying the device and thereby enabling the transaction processing system to determine whether to grant access, or to effect payment, or similar. An example of a suitable device identifier used in payments is a primary account number or PAN, which is used on credit and debit cards to effect payments.

Methods have been proposed to modify or obscure a device identifier during a transaction to increase security. While such proposed systems make it harder for a malicious third party to clone or pretend to be the smart device, such systems still do not obviate a risk that a third party may track a user's movements and activity using data transferred from the device.

SUMMARY

In accordance with at least one embodiment, methods, devices, systems and software are provided for supporting or implementing functionality to transmit and/or process transaction messages.

This is achieved by a combination of features recited in each independent claim. Accordingly, dependent claims prescribe further detailed implementations of various embodiments.

According to a first aspect of the invention there is provided a method for transmitting a transaction message, the method comprising: encrypting, at a transaction device, a transaction device identifier; generating, at the transaction device, a temporary transaction device identifier; causing a transaction message to be sent to a transaction processing system, the transaction message comprising, at least, a first data field configured to hold a transaction device identifier and a second data field configured to hold supplementary data, wherein the temporary transaction device identifier is provided in the first data field and the encrypted transaction device identifier is provided in the second data field.

The temporary transaction device identifier may be generated at least partly using further data, which further data is other than the transaction device identifier. Furthermore, the transaction message may comprise a third data field, and data at least partly identifying a cryptographic key associated with the encryption of the transaction device identifier may be provided in the third data field. The cryptographic key may be generated at least partly using further data, which further data is other than the transaction device identifier. The cryptographic key may further be generated using, in addition, a value uniquely associated with the transaction device identifier.

The method may comprise receiving the further data from the transaction processing system. For a given transaction, at least part of the further data may be specific to the transaction.

In embodiments, the transaction device identifier may comprise data indicative of a primary account number of a financial instrument.

According to a second aspect of the invention there is provided a method of processing a transaction message, the method comprising: receiving a transaction message from a first part of a transaction processing system, the transaction message comprising, at least, a first data field configured to hold a transaction device identifier and a second data field configured to hold supplementary data, the first data field comprising a first transaction device identifier; decrypting data within the supplementary data field to identify a second transaction device identifier; processing the transaction message based on the second transaction device identifier.

The processing may comprise sending a modified transaction message with the first transaction device identifier replaced by the second transaction device identifier to a second part of a transaction processing system. The method may further comprise storing an association between the first transaction device identifier and the second transaction device identifier.

The method may comprise: receiving a response message from the second part of the transaction processing system, the response message comprising a data field configured to hold a transaction device identifier, the data field comprising the second transaction device identifier; modifying the response message to replace the second transaction device identifier with the first transaction device identifier; and sending the modified response message to the first part of the transaction processing system.

The transaction message may comprise a third data field, and data at least partly identifying a cryptographic key associated with the encryption of the data within the second data field may be provided in the third data field. In addition, the transaction message may comprise one or more further data fields configured to hold further transaction data, and the method may comprise verifying the further transaction data using the data in the third data field.

The transaction message may comprise one or more further data fields configured to hold further transaction data, and the method may comprise generating a cryptographic key used to decrypt data within the second data field from the further transaction data. The method may comprise using, in addition, a value uniquely associated with the second transaction device identifier, to verify the further transaction data.

In embodiments, the transaction device identifier may comprise data indicative of a primary account number of a financial instrument.

According to a third aspect of the invention there is provided a method for transmitting a transaction message, the method comprising: generating, at a transaction device, at least one cryptographic data element using at least a transaction device identifier and further data other than the transaction device identifier as inputs to an cryptographic function; causing a transaction message to be sent to a transaction processing system, the transaction message comprising, at least, the further data and the at least one cryptographic data element.

The at least one cryptographic data element may comprise an encrypted version of the transaction device identifier. Furthermore, the method may comprise: generating a cryptographic key using at least the further data; and generating the encrypted version of the transaction device identifier using the cryptographic key. The method may further comprise using, in addition, a value uniquely associated with the transaction device identifier to generate the cryptographic key. The at least one cryptographic data element may further comprise data at least partly identifying the cryptographic key.

In embodiments, the transaction device identifier may comprise data indicative of a primary account number of a financial instrument.

According to a fourth aspect of the invention there is provided a method of processing a transaction message, the method comprising: receiving, from a first part of a transaction processing system, a transaction message, the transaction message comprising a first transaction device identifier and at least two cryptographic data elements; and using a first of the cryptographic data elements to determine a cryptographic key; decrypting a second of the cryptographic data elements whereby to determine a second transaction device identifier; and processing the transaction message based on the second transaction device identifier.

The processing may comprise sending a modified transaction message with the first transaction device identifier replaced by the second transaction device identifier to a second part of a transaction processing system. The method may also comprise storing an association between the first transaction device identifier and the second transaction device identifier.

The method may comprise: receiving a response message from the second part of the transaction processing system, the response message comprising a data field configured to hold a transaction device identifier, the data field comprising the second transaction device identifier; modifying the response message to replace the second transaction device identifier with the first transaction device identifier; and sending the modified response message to the first part of the transaction processing system.

The transaction message may comprise one or more further data fields configured to hold further data, and the method may comprise verifying the further data using the first of the cryptographic data elements. The method may further comprise using, in addition, a value uniquely associated with the second transaction device identifier, to verify the further data.

In embodiments, the transaction device identifier may comprise data indicative of a primary account number of a financial instrument.

According to a fifth aspect of the invention there is provided a method of processing a transaction message, the method comprising: receiving, from a first part of a transaction processing system, a transaction message, the transaction message comprising a first transaction device identifier, a cryptographic data element and further data; generating a cryptographic key using at least the further data; decrypting the cryptographic data element using the cryptographic key whereby to determine a second transaction device identifier; and processing the transaction message based on the second transaction device identifier.

According to a sixth aspect of the invention there is provided apparatus for use in transmitting a transaction message from a transaction device, the apparatus configured to: encrypt a transaction device identifier; generate a temporary transaction device identifier; cause a transaction message to be sent to a transaction processing system, the transaction message comprising, at least, a first data field configured to hold a transaction device identifier and a second data field configured to hold supplementary data, wherein the temporary transaction device identifier is provided in the first data field and the encrypted transaction device identifier is provided in the second data field.

According to a seventh aspect of the invention there is provided apparatus for processing a transaction message, the apparatus configured to: receive a transaction message from a first part of a transaction processing system, the transaction message comprising, at least, a first data field configured to hold a transaction device identifier and a second data field configured to hold supplementary data, the first data field comprising a first transaction device identifier; decrypt data within the supplementary data field to identify a second transaction device identifier; process the transaction message based on the second transaction device identifier.

According to a eighth aspect of the invention there is provided apparatus for use in transmitting a transaction message from a transaction device, the apparatus configured to: generate at least one cryptographic data element using at least a transaction device identifier and further data as inputs to an cryptographic function; cause a transaction message to be sent to a transaction processing system, the transaction message comprising, at least, the further data and the at least one cryptographic data element.

According to a ninth aspect of the invention there is provided apparatus for processing a transaction message, the apparatus configured to: receive, from a first part of a transaction processing system, a transaction message, the transaction message comprising a first transaction device identifier and at least two cryptographic data elements; and use a first of the cryptographic data elements as a cryptographic key to decrypt a second of the cryptographic data elements whereby to determine a second transaction device identifier; and process the transaction message based on the second transaction device identifier.

According to a tenth aspect of the invention there is provided apparatus for processing a transaction message, the apparatus configured to: receive, from a first part of a transaction processing system, a transaction message, the transaction message comprising a first transaction device identifier, a cryptographic data element and further data; generate a cryptographic key using at least the further data; decrypt the cryptographic data element using the cryptographic key whereby to determine a second transaction device identifier; and process the transaction message based on the second transaction device identifier.

According to a eleventh aspect of the invention there is provided a computer program for use in transmitting a transaction message from a transaction device, the computer program configured to: encrypt a transaction device identifier; generate a temporary transaction device identifier; cause a transaction message to be sent to a transaction processing system, the transaction message comprising, at least, a first data field configured to hold a transaction device identifier and a second data field configured to hold supplementary data, wherein the temporary transaction device identifier is provided in the first data field and the encrypted transaction device identifier is provided in the second data field.

According to a twelfth aspect of the invention there is provided a computer program for processing a transaction message, the computer program configured to: receive a transaction message from a first part of a transaction processing system, the transaction message comprising, at least, a first data field configured to hold a transaction device identifier and a second data field configured to hold supplementary data, the first data field comprising a first transaction device identifier; decrypt data within the supplementary data field to identify a second transaction device identifier; process the transaction message based on the second transaction device identifier.

According to a thirteenth aspect of the invention there is provided a computer program for use in transmitting a transaction message from a transaction device, the computer program configured to: generate at least one cryptographic data element using at least a transaction device identifier and further data as inputs to an cryptographic function; cause a transaction message to be sent to a transaction processing system, the transaction message comprising, at least, the further data and the at least one cryptographic data element.

According to a fourteenth aspect of the invention there is provided a computer program for processing a transaction message, the computer program configured to: receive, from a first part of a transaction processing system, a transaction message, the transaction message comprising a first transaction device identifier and at least two cryptographic data elements; and use a first of the cryptographic data elements as a cryptographic key to decrypt a second of the cryptographic data elements whereby to determine a second transaction device identifier; and process the transaction message based on the second transaction device identifier.

According to a fifteenth aspect of the invention there is provided a computer program for processing a transaction message, the computer program configured to: receive, from a first part of a transaction processing system, a transaction message, the transaction message comprising a first transaction device identifier, a cryptographic data element and further data; generate a cryptographic key using at least the further data; decrypt the cryptographic data element using the cryptographic key whereby to determine a second transaction device identifier; and process the transaction message based on the second transaction device identifier.

According to a sixteenth aspect of the invention, there is provided a method for transmitting a transaction message from a transaction device having a transaction device identifier, the method comprising: encrypting, at a transaction device, a transaction device identifier; generating, at the transaction device, a transaction message for a transaction system, the transaction message comprising, at least, a first data field configured to hold a transaction device identifier and a second data field configured to hold supplementary data; and sending the transaction message to a transaction processing system, wherein the generation of the transaction message comprises providing data in the first data field of the transaction message that does not identify the transaction device and providing the encrypted transaction device identifier in the second data field of the transaction message.

According to a seventeenth aspect of the invention, there is provided a method of processing a transaction message, the method comprising: receiving a transaction message from a first part of a transaction processing system, the transaction message comprising, at least, a first data field configured to hold a transaction device identifier and a second data field configured to hold supplementary data; decrypting data within the supplementary data field to generate decrypted data; processing the transaction message using said decrypted data to form the transaction device identifier instead of the data in the first data field.

According to an eighteenth aspect of the invention, there is provided apparatus for use in transmitting a transaction message from a transaction device, the apparatus configured to:
  encrypt a transaction device identifier; generate a transaction message comprising, at least, a first data field configured to hold a transaction device identifier and a second data field configured to hold supplementary data; and send the transaction message to the transaction processing system, wherein the apparatus is arranged to generate the transaction message such that data that does not identify the transaction device is provided in the first data field and the encrypted transaction device identifier is provided in the second data field.

According to a nineteenth aspect of the invention, there is provided apparatus for processing a transaction message, the apparatus configured to: receive a transaction message from a first part of a transaction processing system, the transaction message comprising, at least, a first data field configured to hold a transaction device identifier and a second data field configured to hold supplementary data; decrypt data within the supplementary data field to generate decrypted data; and process the transaction message using said decrypted data to form the transaction device identifier instead of the data in the first data field.

Further features and advantages will become apparent from the following description of preferred embodiments, given by way of example only, which is made with reference to the accompanying drawings.

BRIEF DESCRIPTION OF THE DRAWINGS

Systems, apparatuses and methods will now be described as embodiments, by way of example only, with reference to the accompanying figures in which.

Some parts, components and/or steps of the embodiments appear in more than one Figure; for the sake of clarity the same reference numeral will be used to refer to the same part, component or step in all of the Figures.

DETAILED DESCRIPTION OF CERTAIN INVENTIVE EMBODIMENTS

Figure 1:
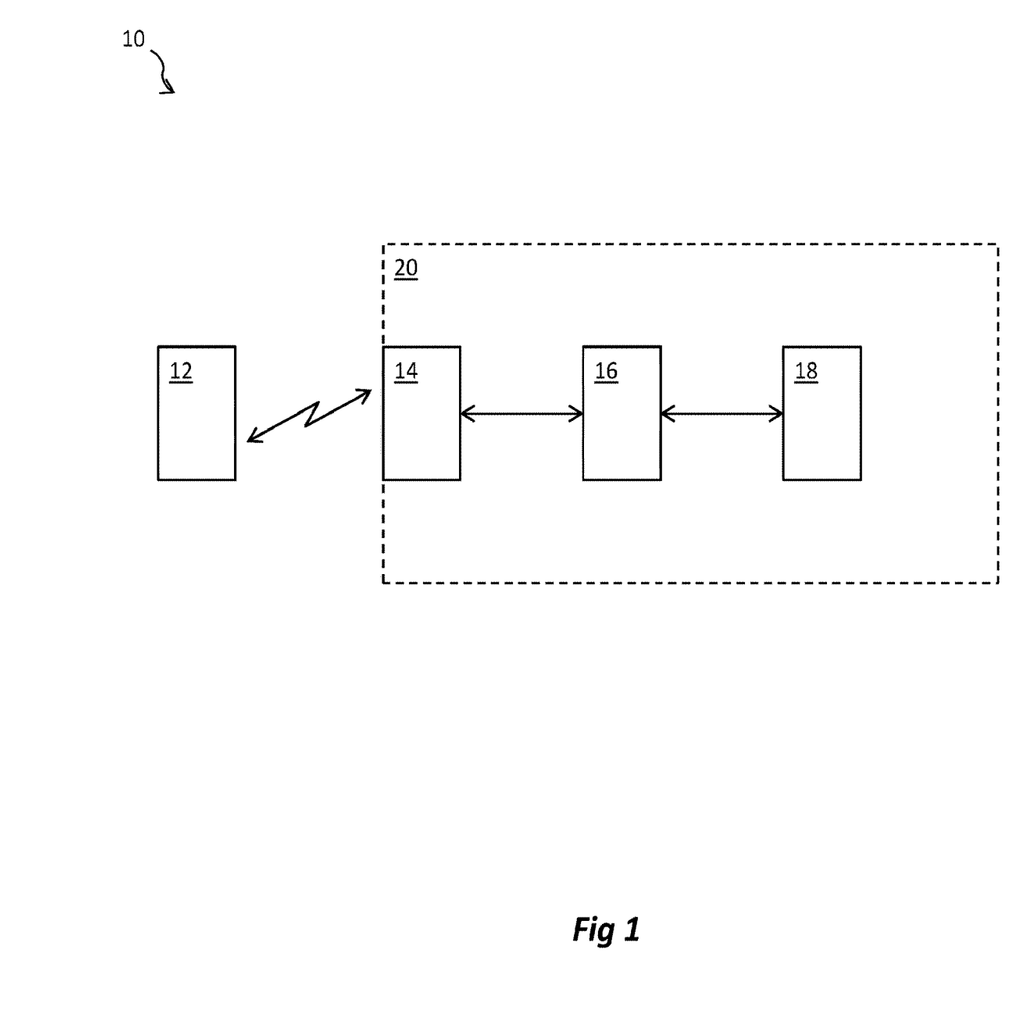
FIG. 1 shows a schematic diagram of a transaction system in which embodiments of the invention may be practiced.

FIG. 1 shows a transaction system 10. A transaction device 12, is provided. Examples of suitable transaction devices include smart cards, access cards, fobs, financial instruments such as payment cards, mobile telephones and other portable electronic devices such as tablets and smart watches. The transaction device 12 has a data connection to a transaction terminal 14. Examples of suitable transaction terminals include payment terminals, access points to transit systems, and doors.

The data connection between the transaction device 12 and the transaction terminal 14 may be contactless. Examples of contactless connection technologies which may be used include near field communications (NFC) and optical systems—the latter being, for example, provided by a system which uses a camera in a mobile telephone to identify and read data presented on e.g. a screen of the terminal. The data connection may alternatively be a contact connection using a suitable arrangement of electrically conductive pads and pins to enable communication.

The transaction terminal 14 is connected to a first transaction processing server 16, which is in turn connected to a second transaction processing server 18. Together the terminal 14 and servers 16 and 18 may be considered to constitute a transaction processing system 20. While not shown, one or more additional transaction processing servers may be provided between the transaction terminal 14 and first transaction processing server 16. Likewise, one or more additional transaction processing servers may be provided between the first transaction processing server 16 and the second transaction processing server 18. Collectively, the transaction terminal 14 and any additional transaction processing servers between the transaction terminal 14 and first transaction processing server 16 may be considered as a first part of the transaction processing system 20. Equally, the second transaction processing server 18 and any additional transaction processing servers between the first transaction processing server 16 and the second transaction processing server 18 may be considered as a second part of the transaction processing system 20.

While only a single instance of each of the device 12, terminal 14 and servers 16 and 18 are shown, it will be appreciated that the transaction system 10 may be substantially more complex, with multiple devices 12 (representing devices provided to multiple users), multiple terminals 14 (representing, for example, multiple payment terminals or access terminals) and even multiple servers 16 and 18.

Figure 2:
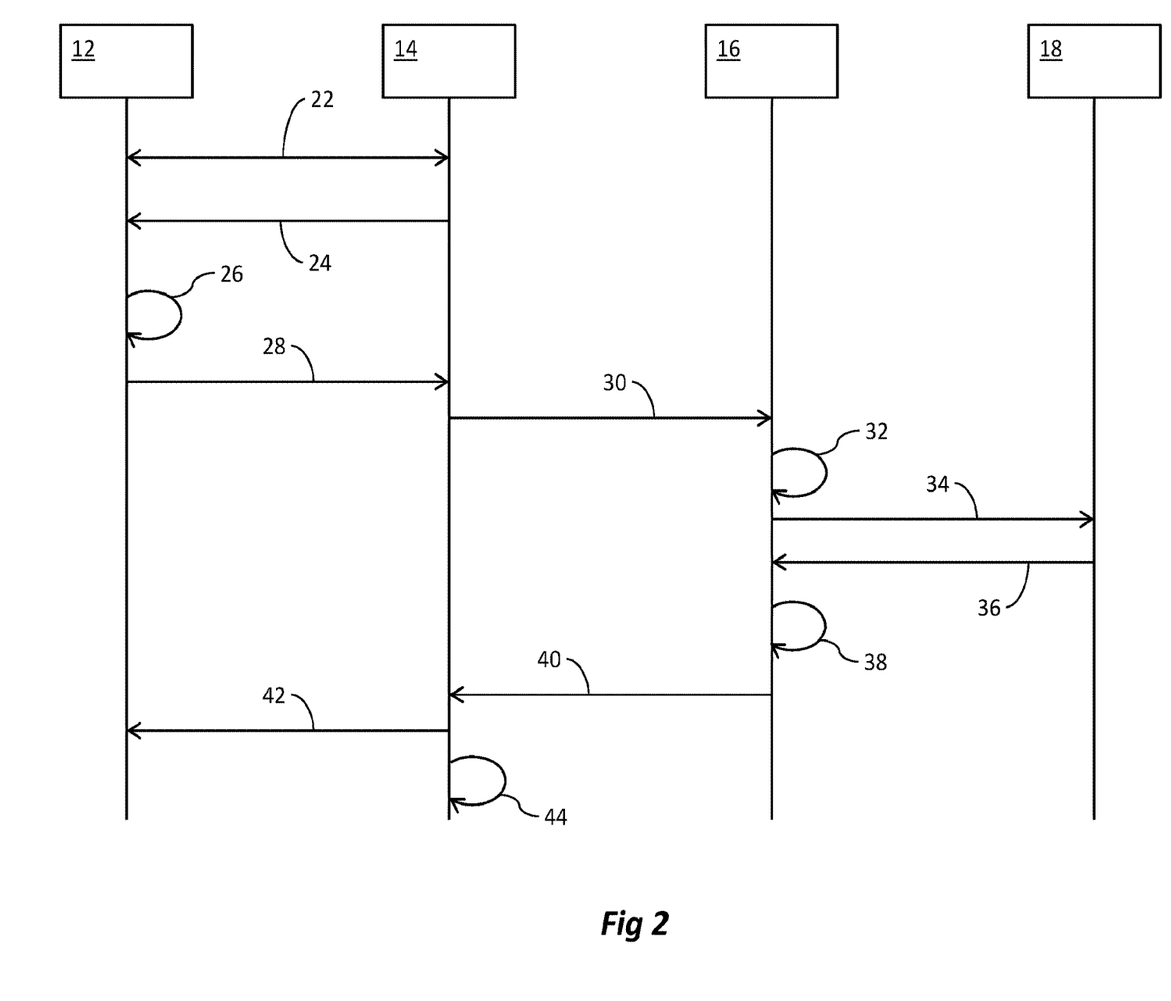
FIG. 2 illustrates a communication flow according to an embodiment.

The operation of the transaction system 10 shown in FIG. 1 during a transaction will now be described with reference to FIG. 2. In general, in this transaction a transaction device 12 is presented to a transaction terminal 14, and the transaction processing system 20 operates to authorize or deny the transaction. Depending on whether the transaction is authorized or denied, the transaction terminal, or a device connected thereto, may perform some action (such as opening a door), alternatively or additionally, a message may be sent back to the transaction device. A more detailed description follows.

In a first step 22, a transaction is instigated and the transaction device 12 connects to the transaction terminal 14. The instigation of the transaction may, for example, include a user selecting goods or services to purchase, or selecting a destination for a ticketing transaction. This may require user input, or alternatively may be predetermined based on the identity of the transaction terminal—for example an identity of a transaction terminal on a transit system may be used to define the service required without any specific user input.

The connection between the transaction device 12 and the transaction terminal 14 may be established by the transaction device 12 being presented to the terminal and a contactless, e.g. near field communication (NFC), connection being established. Alternatively, a transaction device 12 may be physically inserted into or connected to the transaction terminal 14 to enable an electrical connection to be established. Such methods are known in the art and need not be described in detail here.

Having, in step 22, instigated the transaction and established the connection transaction data associated with the transaction may be sent, in step 24, from the transaction terminal 14 to the transaction device 12. This transaction data may include, for example, a price to be paid in the transaction or an identity of an entry or egress point for a ticketing transaction on a transit system. In general, the nature of the transaction as described above will define the transaction data.

In step 26, the transaction device prepares a transaction message, and in step 28 the transaction message is sent to from the transaction device to the transaction terminal 14. A more detailed description of the content of this message, and the methods by which it is created in steps 24 to 28 will be provided below with reference to FIG. 3.

In step 30 transaction terminal then forwards the message on to the first transaction processing server 16. As will be appreciated from the description above, this may involve sending the message via one or more further transaction processing servers.

In step 32, the first transaction processing server 16 processes the transaction message. In some embodiment the first transaction processing server 16 may be capable of authorizing or denying the transaction. In such cases, the signaling flow may pass straight to step 40 described below.

In the alternative, the second transaction processing server 18 may be the entity capable of authorizing or denying the transaction. In such cases, the first transaction processing server 16 may modify the message. The modified message may then be sent to the second transaction processing server 18 in step 34.

The second transaction processing server 18 then authorizes or denies the transaction and, in step 38, sends a response message to the first transaction processing server 16. This response message may again be processed by the first transaction processing server 16, before the modified response message is sent, in step 40, to the transaction terminal 14. A more detailed description of the processing of the message by the first transaction processing server 16 in steps 30 to 40 will be provided below with reference to FIG. 4.

Upon receipt of the response message in step 40, the transaction terminal 14 may perform any number of actions.

For example, the transaction terminal 14 may send a response message to the transaction device 42. This response message may contain data indicative of the transaction being authorized, and may, if required, include a ticket or other data structure which may be stored by the transaction device 12 for later use. Alternatively, or additionally, the transaction device may take an appropriate action, shown by step 44. This action may be, for example, to open a door or ticketing barrier, or may be the provision of an indication that the transaction has been authorized (and therefore that the user may be provided with purchased goods or services).

The above processing flow is known in the art of transaction systems and therefore has been described in overview only.

Figure 3:
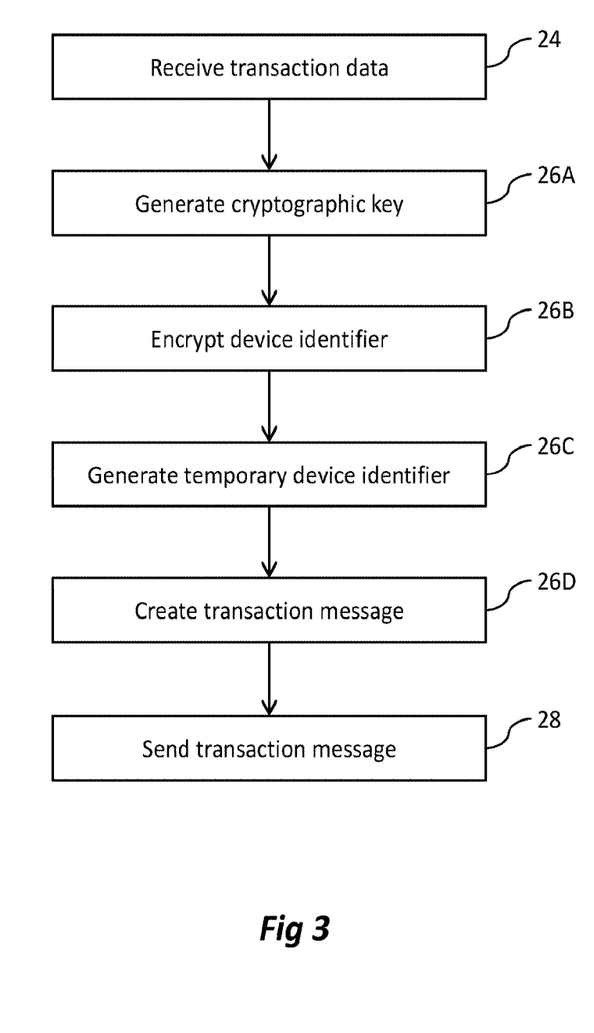
FIG. 3 illustrates a method according to an embodiment.

As mentioned above, a more detailed description of the operation of the transaction device in steps 24 to 28 will now be provided with reference to FIG. 3. Here the transaction device will be assumed to be provided with a transaction device identifier. This is a value or code which enables the transaction processing system to identify the transaction device 12 and distinguish it from other similar transaction devices. An example of a suitable transaction device identifier is a primary account number (PAN) of a financial instrument. In addition to the transaction device identifier, authentication data may be stored by the transaction device 12. This authentication data may be used to enable messages sent from the transaction device 12 to be authenticated by the transaction processing system, thereby enabling the transaction processing system to authorize or deny any given transaction. The authentication data may include supplementary credentials and cryptographic keys which have been earlier provided to the transaction device 12.

In step 24, as mentioned above, the transaction device 12 may receive transaction data from the transaction processing system. This transaction data may include data associated with the identity of the transaction terminal 14, for example an identity of a merchant or transit services provider which provides or uses that terminal, an identity of the terminal itself, a location for the terminal, a channel or domain associated with the communication with the terminal (this may indicate whether wireless or electrical contact is used), and payment details to enable the merchant to receive payment. In addition, the transaction data may include data which is specific to the transaction itself, for example data indicative of a time for the transaction, an amount for a payment, an amount for a reduction in a pre-paid ticket, and/or an identification of any goods or services associated with the transaction. The transaction data comprises at least some data which is other than the transaction device identifier.

In step 26A, the transaction device 12 generates a cryptographic key using the received transaction data. Typically, the cryptographic key will be generated using the transaction data as an input to one or more cryptographic functions. The transaction data may not be the only input to the function, and the following additional inputs may be used:
- a value uniquely associated with the transaction device identifier, for example a hashing key or seed value stored on the transaction device 12;
- the transaction device identifier (it will be apparent that the transaction data referred to above represents data other than the transaction device identifier);
- a value indicative of the number of the transactions which have been previously performed or completed by the transaction device 12; and
- data indicative of a channel or domain used for the transaction.

One example of how a cryptographic key may be generated will now be described. This example will use Elliptic Curve Cryptography (ECC) and a method called ECC El Gamal for key agreement. It will be assumed that a cyclic group G has been defined based on a generator value g. A public key $P_S$ for a transaction processing server, e.g. server 16 has been generated based on the group G and a private key $d_S$ for that server. For example:

$$P_S = d_S \cdot G = g^{d_S}$$

This public key has been made available to the transaction device. In addition, a further key K, the hashing key, has been defined and is known to both the transaction device 12 and to the first transaction processing server 16. The hashing key K may be a value uniquely associated with the transaction device.

In a first step, the transaction device 12 calculates a hash value. This may be done using a keyed-hash message authentication code (HMAC). The inputs to the hash function include the hashing key K and, in this example, a concatenation of the device identifier ($I_D$) and the transaction data. The output of the hashing function is denoted by h, and can be written as:

$$h = \text{HMAC}(K, I_D \| \text{transaction data})$$

Using h and the cyclic group G the transaction device 12 may generate an ephemeral public key $P_D$ for the device for use in the transaction. This public key $P_D$ represents the cryptographic key described above. For example:

$$P_D = h \cdot G = g^h$$

In addition, using h and the public key $P_S$ of the first transaction processing server 16, the transaction device 12 may generate a shared secret S. For example:

$$S = h \cdot P_S = P_S^h = g^{d_S h}$$

Having generated the ephemeral cryptographic key $P_D$, and from that computed the shared secret S, in step 26B the transaction device 12 encrypts the device identifier $I_D$ using the shared secret S to generate an encrypted transaction device identifier C. For example:

$$C = \text{enc}(S, I_D)$$

The cryptographic key $P_D$, and the encrypted transaction device identifier C may each be considered cryptographic data elements which may be sent to the transaction terminal 14 in a transaction message.

In addition to generating the encrypted transaction device identifier C, in step 26C the transaction device 12 may generate a temporary transaction device identifier. The temporary transaction device identifier may be generated entirely randomly, or pseudo randomly. Alternatively it may be based on the encrypted transaction device identifier C; or generated using further data, at least some of which is data other than the transaction device identifier, for example the transaction data described above, or the public key $P_D$ generated for the device.

The temporary transaction device identifier may be generated using a further function, with one of the values described above as an input. For instance, it is typically the case that the device identifier has a certain format—for example being of a certain length. In such cases, the input value may be modified to provide a temporary transaction device identifier. The temporary transaction device identifier may not be wholly generated, and may be based in part on predetermined data, such as a portion of the real transaction device identifier.

As an example, where the transaction device identifier is a 16 digit PAN, the first 6 digits represent a Bank Identification Number (BIN) or Issuer identification number (IIN), and the last digit represents a check digit. The BIN/IIN from the original transaction device identifier may be kept, and augmented with nine digits of the temporary transaction device identifier and a suitable check digit.

In step 26D, the transaction device 12 creates a transaction message to be sent to a transaction processing system using the values generated above. It will often be the case that the transaction message must conform to a certain standard. For example, the transaction message may be formatted in accordance with an EMV standard for payment processing, which specifies mandatory data elements for the transaction message including a data element configured to convey the PAN as a transaction device identifier. Accordingly this standard may specify that the message should comprise, at least, a first data field configured to hold a transaction device identifier and a second data field configured to hold supplementary data. Accordingly, the temporary transaction device identifier, that does not in fact identify the transaction device 12, may be provided in the first data field and the encrypted transaction device identifier may be provided in the second data field. In addition the transaction message may comprise a third data field, and the cryptographic key $P_D$ associated with the encryption of the transaction device identifier may be provided in the third data field. It will be understood that the cryptographic key $P_D$ was not itself used in the encryption of the transaction device identifier. Instead, by virtue of being the public key associated with the shared secret used in the encryption, $P_D$ represents data identifying the cryptographic key associated with the encryption of the transaction device identifier. Finally, some or all of the transaction data may be provided in other fields of the message.

Having generated a suitable transaction message, the transaction device 12, in step 28, sends the transaction message to the transaction processing system, i.e. the transaction terminal 14.

Figure 4:
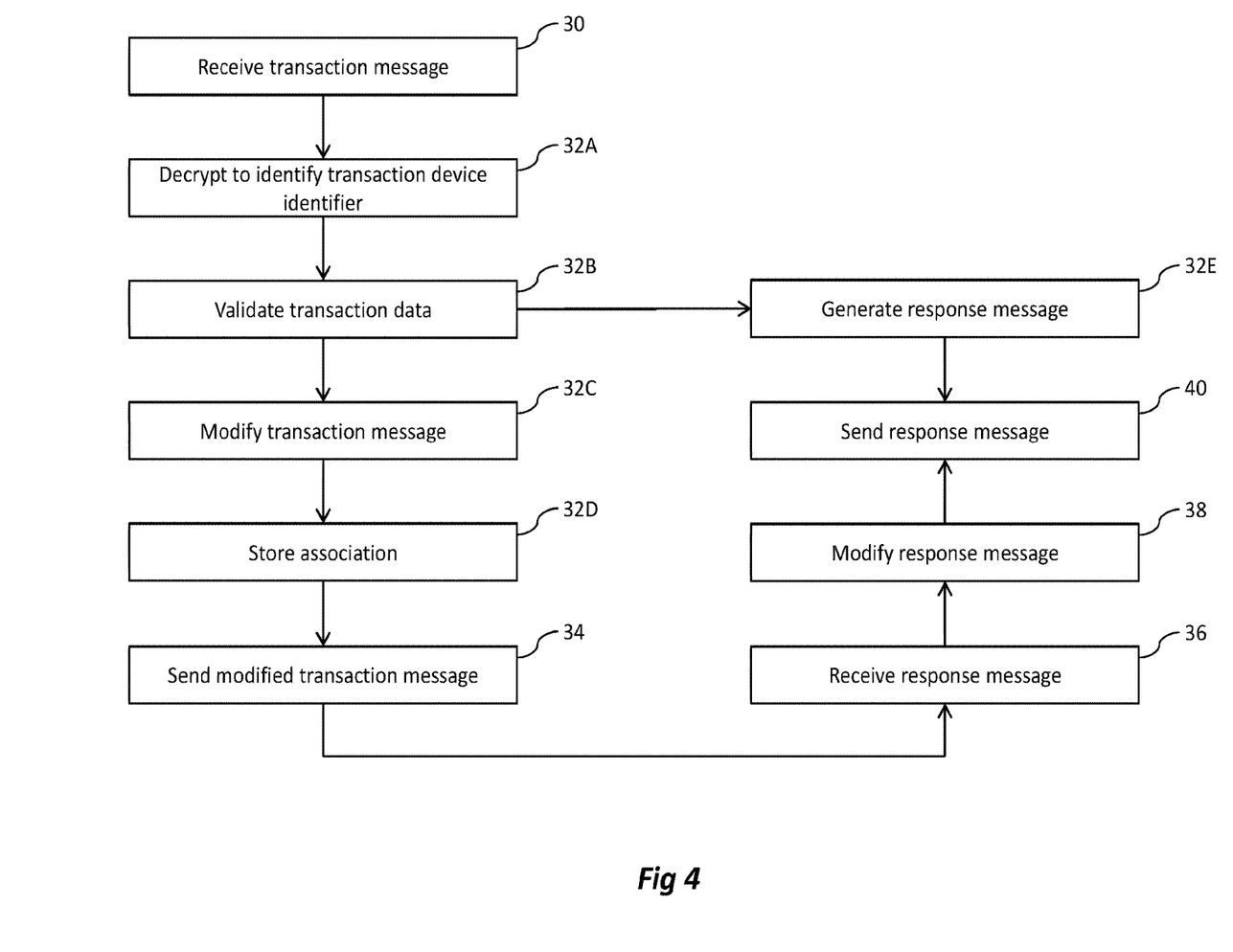
FIG. 4 illustrates a further method according to an embodiment.

A more detailed description of the operation of the first transaction processing server 16 in steps 30 to 40 will now be provided with reference to FIG. 4.

In step 30, the first transaction processing server 16 receives the transaction message. In line with the description above, the message created by the transaction device 12 comprises a temporary transaction device identifier, an encrypted transaction device identifier C and the ephemeral cryptographic key $P_D$. The encrypted transaction device identifier C and the ephemeral cryptographic key $P_D$ may be considered as cryptographic data elements. In addition, the message may contain at least some of the transaction data.

In step 32A, the first transaction processing server 16 may generate the shared secret S using the cryptographic key $P_D$. For example:

$$S = d_S \cdot P_D = P_D^{d_S} = g^{h' d_S}$$

The shared secret S may then be used to decrypt the encrypted transaction device identifier C to generate the original transaction device identifier $I_D$.

In addition, the first transaction processing server 16 may validate any transaction data provided in the transaction message. This may be done by using the original transaction device identifier $I_D$ to look up the hashing key K for the transaction device 12 and then recreating the hash value h' and the ephemeral public key $P'_D$ as described above. For example:

$$h' = HMAC(K, I_D \| \text{transaction data})$$

$$P'_D = h' \cdot G = g^{h'}$$

A comparison of the public key $P_D$ sent in the transaction message and the newly generated public key $P'_D$ will demonstrate whether the transaction data received in the message corresponds to the transaction data used to generate the public key $P_D$.

The first transaction processing server 16 may then process the transaction message based on the original transaction device identifier (i.e. at least part of the decrypted data derived from the encrypted data provided in the second data field). In other words, the transaction message may be processed as if the temporary transaction device identifier were replaced by the original transaction device identifier $I_D$. As mentioned above, the first transaction processing server 16 itself may be able to authorize or deny the transaction at this point. If this is the case, then in step 32E, the first transaction processing server 16 determines, using the original transaction device identifier $I_D$ whether to authorize or deny the transaction and generates a suitable response message. In step 40 the first transaction processing server 16 then sends the response message back to the transaction terminal 14.

However, in the alternative the first transaction processing server 16 may, in step 32C, modify the transaction message, replacing the temporary transaction device identifier with the original transaction device identifier $I_D$. The first transaction processing server 16 may additionally, in step 32D, store an association between the temporary transaction device identifier and the original transaction device identifier $I_D$.

Subsequently, in step 34 the first transaction processing server 16 may send the modified transaction message with the temporary transaction device identifier replaced by the original transaction device identifier the second transaction processing server 18. The second transaction processing server 18 may then process the modified transaction message as a normal message which had been originally provided with an unencrypted transaction device identifier.

In step 36 the first transaction processing server 16 may receive a response message from the second transaction processing server 18. This response message may comprise a data field configured to hold a transaction device identifier, which consequently comprises the original transaction device identifier $I_D$.

In step 38, the first transaction processing server 16 may modify the response message to replace the original second transaction device identifier $I_D$ with the first transaction device identifier, using the association stored in step 32D. The modified response message may then, in step 40, be sent to the transaction terminal 14.

The above described methods present the following advantages. Firstly, the field designed to contain the transaction device identifier in a typical transaction system is limited in size and needs to adhere to strict formatting rules. This puts restrictions on the degree of freedom for any temporary transaction device identifier. By providing a temporary transaction device identifier in a message and separately providing an encrypted transaction device identifier, the degree of freedom for encrypting the transaction device identifier is increased, and therefore security is correspondingly increased. Equally, it is easier to generate the temporary transaction device identifier as it only needs to conform to the requirements of being random, or pseudo random, and enabling the transaction message to be properly handled by the transaction system.

Furthermore, by providing the ephemeral cryptographic key with the transaction message, it is possible to ensure that no information provided in the transaction message can be used to track a user. This is because the ephemeral cryptographic key is itself non deterministic or random and therefore cannot be used to track a user.

It should be noted that a system may be used where a transaction device identifier is encrypted using solely a public key of a recipient server. The disadvantage of such system is that they are susceptible to attack, as the relatively static key (that of the server) means that multiple messages are all sent using the same key, which in turn reduces the security of the system.

A further advantage relates to the size of a cryptographic key which is required to enable effective encryption of the transaction device identifier. For example, a typical length of an ECC cryptographic key required to provide adequate encryption is 32 bytes or more. Providing this key in a message takes up a large amount of the message data, often significantly more than the transaction device identifier itself. For example, a PAN may be uniquely identified by less than 8 bytes of data, a quarter of the data size of the key which may be used to encrypt the PAN. However, in embodiments the cryptographic key also serves as data enabling the transaction data to be verified. This dual use improves the data size efficiency of any message and enables messages, encrypted according to the embodiments described above, to be transmitted using existing systems with restrictions on the size of any message.

Alternative Embodiments and Modifications

While a specific implementation of ECC cryptography has been described above, it will be appreciated that modifications may be made, or entirely different systems may be used, for the generation and use of the cryptographic key. For example, the shared secret S may be used directly to encrypt the device identifier, however in the alternative, a further key, generated using S may be used. Alternatively, an implementation may use lattice based cryptographic methods such as NTRU. For such an implementation, there would be no need to communicate a separate ephemeral key to the server since the output of the encryption mechanism is effectively random.

In the specific implementation described above, the temporary transaction device identifier is random so that no information in the transaction message can be used to track the transaction device 12, and accordingly potentially track the user of the transaction device 12. Alternatively, instead of a random temporary transaction device identifier, a fixed number stored by the transaction device 12 that is the same for many or all transaction devices utilizing the invention could be inserted in the field in the transaction message for the transaction device identifier. In this way, it is not possible to determine the identity of the transaction device from the entry within the transaction device identifier field within the transaction message. Further, such a static transaction device identifier can be used to indicate to a recipient of the transaction message that an encrypted version of the actual transaction device identifier is provided in a separate field of the transaction message.

Embodiments are intended to be compatible with existing systems. Therefore the message sent by the transaction device 12 may conform to existing protocols. In particular, it is intended that only the transaction device 12 and the first transaction processing server 16 need be modified to enable the overall system to operate as before. Consequently, the first transaction processing server 16 may operate to convert any message provided by the transaction device 12 into a format which is usable by the second transaction processing server 18 without requiring modification of the second transaction processing server 18.

In some embodiments, the temporary transaction device identifier may correspond to the encrypted transaction device identifier, and may therefore be used to retrieve the original device identifier. This obviates the need for any further field.

While the cryptographic key has been described as being transmitted with the transaction message, some embodiments may be arranged to generate the cryptographic key from the transaction data in a manner which can be replicated by the first transaction processing server 16. Accordingly, at the first transaction processing server 16, a cryptographic key may be generated using at least the transaction data provided in the transaction message. This cryptographic key may then be used to decrypt any cryptographic data element containing the original transaction device identifier.

In embodiments, the original transaction device identifier may be a pointer to a transaction device identifier useable by the second transaction processing server 18. As such the first transaction processing server 16 may possess a lookup table which enables the pointer to be used to identify a suitable transaction device identifier. Therefore, no modification is needed for the second transaction processing server 18, but the identifier passed between the transaction device 12 and the first transaction processing server 16 need not be selected according to the requirements for a suitable identifier useable by the second transaction processing server 18.

In the specific implementation described above, the transaction terminal 14 forwards the transaction message from the transaction device 12 to a first transaction processing server 16 and the first transaction processing server 16 recovers the transaction device identifier for the transaction device 12. In some implementations, the transaction terminal 14 may be required to authorize a transaction faster than can be achieved if the transaction terminal awaits a response from the first transaction processing server. An example of such an implementation is a ticket gate arrangement in which a transaction terminal within a ticket gate needs to authorize a transaction and transfer ticket information to a transaction device 12 within a short time. In such an implementation, the transaction terminal 14 may send a message to the transaction device 12 including a public key certificate for the transaction terminal 14, and the transaction device 12 may encrypt the transaction device identifier using the public key derived or extracted from the certificate for the transaction terminal 14, preferably using a cryptographic scheme as described above, and send the encrypted transaction device identifier to the transaction terminal 14. The transaction terminal 14 may then recover the transaction device identifier and, for example, compare the recovered transaction device identifier with a blacklist of transaction device identifiers stored by the transaction terminal 14, indicating transaction devices 12 for which no transaction should be made, before authorizing the transaction.

In embodiments, the transaction device itself may be a self-contained device, such as a smart card or fob. In other embodiments, the transaction device 12 be a general purpose computing device, such as a mobile phone or computer, which is contains, or is connected to apparatus which generates the transaction messages. Such an apparatus may be tamper resistant hardware; that is a secure element. In such cases, it will be appreciated that reference to the transaction device performing a given operation, such as sending a message to a terminal, is representative of the transaction device causing another device (e.g. the mobile telephone) to send such a message.

Recently, systems whereby a computing device (such as a mobile telephone) can be used without requiring a secure element, have been proposed. On such system is called "Host Card Emulation" whereby a transaction application executes within a device's application processor. An alternative, but similar system is the use of a "Trusted Execution Environment" within a suitable device. Embodiments of the invention are applicable to these and similar systems.

In some embodiments, the transaction device 12 may not receive any transaction data from the transaction terminal 14, but may generate the transaction data itself. In further embodiments the transaction data may be received by other means. For example it has been proposed to use mobile telephones in transactions, and to enable those mobile telephones to send and receive data via the mobile network alongside any transaction which may occur over a contactless (e.g. NFC) connection between the mobile telephone and a terminal. In such cases, it is envisaged that at least some of the communications described above, whether the provision of transaction data to the transaction device, or transmission of the transaction message, may not involve the transaction terminal 14, but other communications systems.

The connection between the transaction device 12 and the transaction terminal 14 may be bidirectional as described above, but may equally be unidirectional. For example, a mobile telephone may receive transaction data from a terminal via a unidirectional connection (e.g. by photographing a code optically displayed by the terminal) and may then create and send a suitable transaction message via a wireless communications network such as a cellular connection or WiFi. In such cases the transaction terminal may not itself have any communications capabilities with the transaction processing network, and may be, for example, a poster displaying an optical code such as a QR code.

In other embodiments, there may not be a transaction terminal 14 as such, and the transaction device 12 may communicate directly with a network and thereby with the first transaction processing server 16. This may be used for online transactions where the transaction device 12 is a connected computer or portable device.

In some embodiments, other information, such as credentials for enabling the message to be authenticated, may be encrypted alongside the device identifier.

The cryptographic key may be compressed. For example a full elliptical function cryptographic key has an X and a Y component. It is possible to compress the key be providing only the X component alongside one or two bits of data to indicate a sign for the Y component. Knowledge of the X component, the function used, and the sign of the Y component enables the cull cryptographic key to be recreated. In the above description it will be appreciated that where a key is described as being determined or provided, a compressed version thereof may be equivalently used.

The transaction device 12, transaction terminal 14 and transaction processing servers 16 and 18, may comprise computerized hardware as is known in the art. An exemplary computerized system 50, capable of performing the method steps described above, will now be described with reference to FIG. 5.

Figure 5:
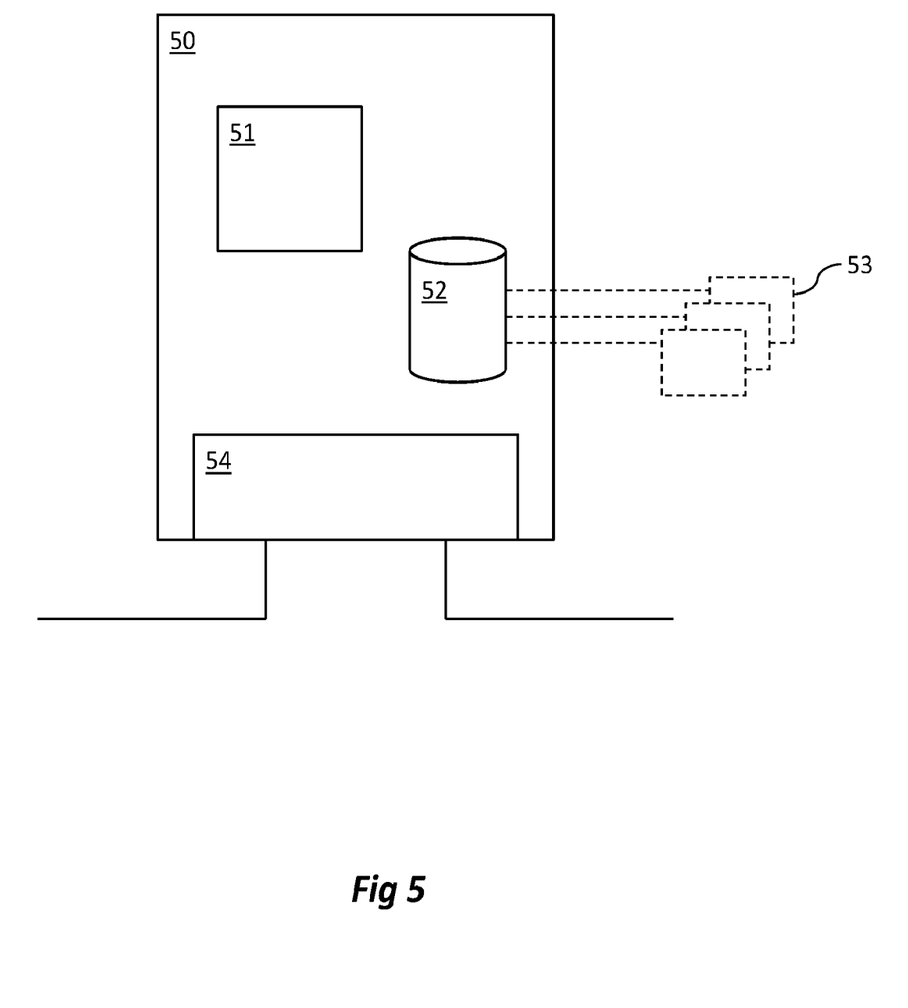
FIG. 5 shows a schematic diagram of a device which may be used in embodiments of the invention.

The computerized system 50 comprises a processing system 51, such as a CPU, or an array of CPUs. The processing system 51 is connected to a computer readable storage medium such as memory 52. This memory may be a volatile memory, for example RAM; or a non-volatile or non-transitory memory, for example a solid state drive (SSD) or hard disk drive (HDD). The system 50 may also comprise an interface 54, capable of transmitting and/or receiving data from other elements in the system.

The memory 52 stores computer readable/computer executable instructions 53. The computer readable instructions may be configured such that when they are executed by the processing system 51, the computerized system 50 is caused to perform the methods described above. To enable this, the processing system 51 may retrieve the computer instructions 53 from memory 52 and execute these instructions. In so doing, the processing system 51 may cause the interface to transmit or receive data as required. This data may itself be stored in memory 52, and retrieved as required—for example to be transmitted via the interface 54.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims. The features of the claims may be combined in combinations other than those specified in the claims.

What is claimed is:

1. A method comprising:
    generating, at a transaction device, a public cryptographic key for the transaction device to use in a transaction, by using a transaction device identifier that identifies the transaction device and transaction data associated with the transaction;
    generating, at the transaction device, a shared secret using the public cryptographic key and a transaction server public key of a transaction processing server included in a transaction processing system;
    encrypting, at the transaction device, the transaction device identifier using the shared secret;
    generating, at the transaction device, a transaction message for a transaction system, wherein the transaction message is formatted according to an EMV standard and comprises a plurality of data fields comprising a first data field that, according to the EMV standard, is specified to hold the transaction device identifier, and a second data field that, according to the EMV standard, is specified to hold supplementary data,
    wherein the generating the transaction message further comprises:
        generating, at the transaction device, a temporary transaction device identifier which does not identify the transaction device,
        inserting the temporary transaction device identifier in the first data field of the transaction message in place of the transaction device identifier,
        inserting the encrypted transaction device identifier, which is encrypted using the shared secret, in the second data field of the transaction message,
        inserting the public cryptographic key of the transaction device in a third data field of the transaction message among the plurality of data fields, and
        inserting the transaction data in a fourth data field of the transaction message among the plurality of data fields; and
    sending the transaction message to the transaction processing system that (i) decrypts the encrypted transaction device identifier located in the second data field using the shared secret recreated using the received public cryptographic key of the transaction device and a transaction server private key that corresponds to the transaction server public key, and (ii) validates the received transaction data using the decrypted transaction device identifier.

2. The method of claim 1, wherein the public cryptographic key is generated at least in part using further data different from the transaction device identifier.

3. The method of claim 2, wherein the public cryptographic key is generated further using a value uniquely associated with the transaction device identifier.

4. The method of claim 2, further comprising receiving the further data from the transaction processing system.

5. The method of claim 2, wherein, for a given transaction, at least part of the further data is specific to the given transaction.

6. The method of claim 1, wherein the generating the temporary transaction device identifier further comprises:
generating the temporary transaction device identifier at least in part using further data, which is different from the transaction device identifier.

7. The method of claim 1, wherein the transaction device identifier comprises data indicative of a primary account number of a financial instrument.

8. The method of claim 1, wherein the transaction device identifier is a data element configured to convey information of a primary account number (PAN) of a financial instrument to be used in the transaction, and wherein the first data field is specified by the EMV standard to hold the data element.

9. A transaction device comprising:
a processor; and
a memory storing computer-readable code, which, when executed by the processor, causes the transaction device to perform operations including:
generating a public cryptographic key for the transaction device to use in a transaction, by using a transaction device identifier that identifies the transaction device and transaction data associated with the transaction;
generating a shared secret using the public cryptographic key and a transaction server public key of a transaction processing server included in a transaction processing system;
encrypting the transaction device identifier using the shared secret;
generating a transaction message for a transaction system, wherein the transaction message is formatted according to an EMV standard and comprises a plurality of data fields comprising a first data field that, according to the EMV standard, is specified to hold the transaction device identifier, and a second data field that, according to the EMV standard, is specified to hold supplementary data,
wherein the generating the transaction message further includes:
generating a temporary transaction device identifier which does not identify the transaction device,
inserting the temporary transaction device identifier in the first data field of the transaction message in place of the transaction device identifier,
inserting the encrypted transaction device identifier, which is encrypted using the shared secret, in the second data field of the transaction message,
inserting the public cryptographic key of the transaction device in a third data field of the transaction message among the plurality of data fields, and
inserting the transaction data in a fourth data field of the transaction message among the plurality of data fields; and
sending the transaction message to the transaction processing system that (i) decrypts the encrypted transaction device identifier located in the second data field using the shared secret recreated using the received public cryptographic key of the transaction device and a transaction server private key that corresponds to the transaction server public key, and (ii) validates the received transaction data using the decrypted transaction device identifier.

10. The transaction device of claim 9, wherein the public cryptographic key is generated at least in part using further data different from the transaction device identifier.

11. The transaction device of claim 10, wherein the public cryptographic key is generated further using a value uniquely associated with the transaction device identifier.

12. The transaction device of claim 10, wherein the operations further include receiving the further data from the transaction processing system.

13. The transaction device of claim 10, wherein, for a given transaction, at least part of the further data is specific to the given transaction.

14. The transaction device of claim 9, wherein the generating the temporary transaction device identifier further includes:
generating the temporary transaction device identifier at least in part using further data, which is different from the transaction device identifier.

15. The transaction device of claim 9, wherein the transaction device identifier comprises data indicative of a primary account number of a financial instrument.

* * * * *